(12) United States Patent
Kunishi et al.

(10) Patent No.: US 7,517,944 B2
(45) Date of Patent: Apr. 14, 2009

(54) PROCESS FOR PRODUCING POLYCARBONATE

(75) Inventors: Noriyuki Kunishi, Chiba (JP); Eizo Saito, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 278 days.

(21) Appl. No.: 10/586,728

(22) PCT Filed: Feb. 22, 2005

(86) PCT No.: PCT/JP2005/002773

§ 371 (c)(1),
(2), (4) Date: Jul. 21, 2006

(87) PCT Pub. No.: WO2005/082971

PCT Pub. Date: Sep. 9, 2005

(65) Prior Publication Data

US 2008/0242828 A1 Oct. 2, 2008

(30) Foreign Application Priority Data

Feb. 26, 2004 (JP) .............................. 2004-051490

(51) Int. Cl.
*C08G 64/00* (2006.01)
*C08G 63/02* (2006.01)

(52) U.S. Cl. ............................ 528/196; 55/423; 55/486; 55/498; 55/528; 210/299; 210/348; 210/788; 210/799; 494/36; 494/49; 528/198

(58) Field of Classification Search .................... 55/423, 55/486, 498, 528; 210/299, 348, 788, 799; 494/36, 49; 528/196, 198
See application file for complete search history.

(56) References Cited

U.S. PATENT DOCUMENTS 5,047,497 A * 9/1991 Tamura et al. ............... 528/199
6,458,920 B1 10/2002 Baxendell et al.

FOREIGN PATENT DOCUMENTS

JP 7-268090 10/1995
JP 08-245780 9/1996

* cited by examiner

*Primary Examiner*—Terressa M Boykin
(74) *Attorney, Agent, or Firm*—Oblon, Spivak, McClelland, Maier & Neustadt, P.C.

(57) ABSTRACT

Provided a process for producing a polycarbonate which comprises reacting an aqueous alkali solution of a dihydric phenol with phosgene in the presence of an organic solvent to produce a polycarbonate oligomer and subsequently polycondensing the oligomer, wherein an emulsion solution of a polycarbonate oligomer-containing organic solvent obtained in the polycarbonate oligomer production step is introduced into a coalescer to separate the emulsion solution into a polycarbonate oligomer-containing organic solvent phase and an aqueous phase, and the polycarbonate oligomer-containing organic solvent phase is subjected to polycondensation. Thus the emulsion solution of a polycarbonate oligomer-containing organic solvent obtained in the polycarbonate oligomer production step is efficiently separated to reduce the content of impurity-containing water in the oligomer for producing a polycarbonate having excellent quality and to a obtain wastewater having a low content of organic materials.

9 Claims, 1 Drawing Sheet

US 7,517,944 B2

PROCESS FOR PRODUCING POLYCARBONATE

TECHNICAL FIELD

The present invention relates to a process for producing a polycarbonate and, more specifically, to a process for producing a polycarbonate which comprises reacting an aqueous alkali solution of a dihydric phenol compound with phosgene in the presence of an organic solvent to produce a polycarbonate oligomer and subsequently polycondensing the oligomer, in which an emulsion solution of a polycarbonate oligomer-containing organic solvent obtained in the polycarbonate oligomer production step is efficiently separated to reduce the content of impurity-containing water in the oligomer for producing a polycarbonate having excellent quality and to a obtain wastewater having a low content of organic materials.

BACKGROUND ART

An interfacial polycondensation method and a transesterification method are known as a process for producing a polycarbonate. From the standpoint of quality, an interfacial polycondensation method using a halogen-containing organic solvent such as methylene chloride is currently the main trend.

In the interfacial polycondensation method, a polycarbonate is obtained by reacting a dihydric phenol with phosgene. In this case, a process in which an oligomer is first produced and is thereafter further subjected to polycondensation to produce a polycarbonate is generally adopted from the standpoint of reaction control, etc.

When a polycarbonate is produced by such an interfacial polycondensation method, a mixture of a polycarbonate-containing organic solvent solution and an aqueous solution is obtained after termination of the polycondensation. Since the polycarbonate-containing organic solvent solution is generally in the form of an emulsion, it is necessary to separate the emulsion into an organic solvent solution of the polycarbonate and an aqueous solution containing impurities.

In general, as a method for efficiently carrying out liquid-liquid separation, a method utilizing a centrifuge to forcibly apply a gravity force is known. With this method, apparatus costs become high although the separation efficiency is good. Further, since an interface is substantially present in the centrifuge separator, an intermediate phase accumulates therein. Thus, a problem that the process must be periodically stopped for cleaning still remains even if the accumulation is reduced.

The aqueous solution containing impurities becomes a wastewater. For the removal of phenol compounds contained in the wastewater, a method is known in which such a wastewater is contacted with an oligomer to transfer the unreacted phenol to a polycarbonate oligomer solution, the thus obtained unreacted phenol-containing polycarbonate oligomer solution being thereafter subjected to a polymerization treatment (Patent Document 1). Also, a method in which a polycarbonate oligomer is produced under specific conditions for the purpose of obtaining a polycarbonate having favorable properties and a wastewater having a high purity is known (Patent Document 2).

With regard to the separation into an organic solvent solution containing the polycarbonate oligomer and an aqueous solution after the above-described treatment, however, these publications merely disclose a still standing separator method.

In order to obtain a wastewater having desired properties in Patent Document 1 and Patent Document 2, not only the treatment conditions in the process but also the separation method is important. When the separation is insufficient, not only phenol compounds but also a part of the organic solvent solution containing a polycarbonate oligomer contaminates the wastewater. As a consequence, a wastewater which is sufficiently clean cannot be obtained.

Since the phenol compounds contained in an emulsion solution of a polycarbonate oligomer-containing organic solvent contain hydrophilic hydroxide groups and lipophilic aromatic rings, they can function as a surfactant. Therefore, it is difficult to separate them. Further, in general, when two liquids having different specific gravities are separated by still standing, an intermediate layer which is recognized to be unavoidably formed accumulates. Therefore, it is often necessary to periodically conduct cleaning or, as the case may be, to stop the process for conducting cleaning.

Additionally, when water containing impurities remains in the separated polycarbonate oligomer, the quality of the polycarbonate is deteriorated so that it is difficult to obtain a resin having a high heat resistance from such polycarbonate.

On the other hand, it is widely known to use a coalescer for liquid-liquid separation. Thus, various techniques have been disclosed for the liquid-liquid separation using coalescers in polycarbonate production processes (Patent Documents 3 to 7).

These techniques, however, are directed to the separation of a polymer solution mixture obtained after the termination of the polycarbonate polymerization but are not related to separation of a polycarbonate oligomer solution mixture or separation under the conditions where a large amount of phenol compounds are present in an aqueous phase.

Patent Document 1: Japanese Laid Open Patent Publication No. H08-245780
Patent Document 2: Japanese Laid Open Patent Publication No. 2002-338679
Patent Document 3: Japanese Patent Publication No. S46-41622
Patent Document 4: Japanese Laid Open Patent Publication No. S55-104316
Patent Document 5: Japanese Laid Open Patent Publication No. H07-309940
Patent Document 6: Japanese Laid Open Patent Publication No. 2001-31755
Patent Document 7: Japanese Publication of Translation of PCT No. 2002-528580

DISCLOSURE OF INVENTION

It is an object of the present invention to provide a process for producing a polycarbonate which comprises reacting an aqueous alkali solution of a dihydric phenol compound with phosgene in the presence of an organic solvent to produce a polycarbonate oligomer and subsequently polycondensing the oligomer, in which an emulsion solution containing a polycarbonate oligomer obtained in the polycarbonate oligomer production step is efficiently separated to obtain a clear wastewater and to reduce the content of impurity-containing water in the polycarbonate oligomer for producing a polycarbonate having excellent quality.

The present inventors have made an earnest study to solve the above-described problems, have found that, in a process for producing a polycarbonate which comprises producing a polycarbonate oligomer and subsequently polycondensing the oligomer as described above, when a coalescer is used for the separation of an emulsion solution which contains a polycarbonate oligomer and which is obtained in the polycarbonate oligomer production step, it is possible to efficiently separate it into an organic solvent phase and an aqueous phase, to obtain clean waste water and to produce a polycarbonate having excellent quality, and have arrived at the present invention.

That is, the present invention provides a process for producing a polycarbonate as follows:

(1) A process for producing a polycarbonate which comprises reacting an aqueous alkali solution of a dihydric phenol compound with phosgene in the presence of an organic solvent to produce a polycarbonate oligomer and subsequently polycondensing the oligomer, characterized in that an emulsion solution containing a polycarbonate oligomer obtained in the polycarbonate oligomer production step is introduced into a coalescer to separate the emulsion solution into a polycarbonate oligomer-containing organic solvent phase and an aqueous phase, and the polycarbonate oligomer-containing organic solvent phase is subjected to polycondensation.

(2) A process for producing a polycarbonate as defined in (1) above, in which the polycarbonate oligomer-containing organic solvent phase separated in the coalescer is introduced into a tank for still standing separation, and a polycarbonate oligomer-containing organic solvent phase separated in the coalescer is subjected to polycondensation.

BEST MODE FOR CARRYING OUT THE INVENTION

Figure 1:
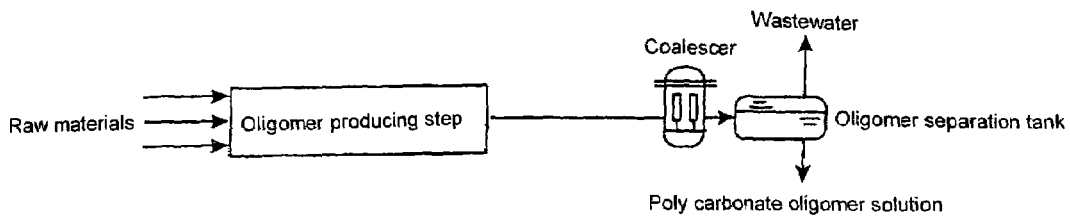
FIG. 1 is an explanatory view of an embodiment in which an oligomer separation tank (tank for still standing separation) is disposed immediately downstream of a coalescer.

The present invention is mainly applied to an interfacial polycondensation method. As raw materials, phosgene which is prepared from chlorine and carbon monoxide, a dihydric phenol, a chain terminating agent or a chain branching agent optionally used as a molecular weight controlling agent, and an aqueous alkali solution for dissolving the dihydric phenol are used.

As the dihydric phenols used as a raw material for a polycarbonate, a compound represented by the general formula (I):

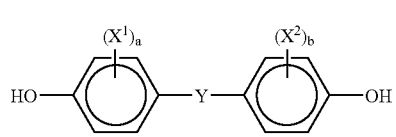

may be, for example, mentioned.

In the above general formula (I), $X^1$ and $X^2$ each represent a linear, branched or cyclic alkyl group having from 1 to 6 carbon atoms. Examples of such an alkyl group include a methyl group, an ethyl group, a n-propyl group, an isopropyl group, a n-butyl group, an isobutyl group, a tert t-butyl group, a n-amyl group, an isoamyl group, a n-hexyl group, an isohexyl group, a cyclopentyl group and a cyclohexyl group. $X^1$ and $X^2$ may be the same with or different from each other. The symbols a and b each represent the number of substituents and is an integer of from 0 to 4. When a plural number of $X^1$ exist, the plural $X^1$ may be the same with or different from each other. When a plural number of $X^2$ exist, the plural $X^2$ may be the same with or different from each other.

Y represents a direct bond, an alkylene group having from 1 to 8 carbon atoms (such as a methylene group, an ethylene group, a propylene group, a butylenes group, a pentylene group or a hexylene group), an alkylidene group having from 2 to 8 carbon atoms (such as an ethylidene group or an isopropylidene group), a cycloalkylene group having from 5 to 15 carbon atoms (such as a cyclopentylene group or a cyclohexylene group), a cycloalkylidene group having from 5 to 15 carbon atoms such as a cyclopentylidene group or a cyclohexylidene group), a bond of —S—, —SO—, —SO$_2$—, —O— or —CO—, or a bond of the following formula (II-1) or formula (II-2):

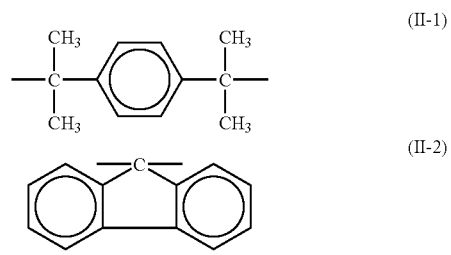

As the dihydric phenol represented by the general formula (I), various compounds exist. Particularly, 2,2-bis(4-hydroxyphenyl)propane (generally called bisphenol A) is suitably used. Examples of the dihydric phenols other than bisphenol A include dihydroxydiaryalkanes such as bis(4-hydroxyphenyl)methane, bis(4-hydroxyphenyl)phenylmethane, bis(4-hydroxyphenyl)naphthylmethane, bis(4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl) ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl) pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, and 2,2-bis(4-hydroxyphenyl)-1,1,1,3,3,3-hexafluoropropane; dihydroxydiarylcycloalkanes such as 1,1-bis(4-hydroxyphenyl)cyclohexane, 1,1-bis(3,5-dichloro-4-hydroxyphenyl)cyclohexane, and 1,1-bis(4-hydroxyphenyl)cyclodecane; dihydroxydiarylsulfones such as bis(4-hydroxyphenyl)sulfone, bis(3,5-dimethyl-4-hydroxyphenyl)sulfone, and bis(3-chloro-4-hydroxyphenyl)sulfone; dihydroxydiaryl ethers such as bis(4-hydroxyphenyl)ether, and bis(3,5-dimethyl-4-hydroxyphenyl)ether; dihydroxydiaryl ketones such as 4,4'-dihydroxybenzophenone, and 3,3',5,5'-tetramethyl-4,4'-dihydroxybenzophenone; dihydroxydiarylsulfides such as bis(4-hydroxyphenyl)sulfide, bis(3-methyl-4-hydroxyphenyl)sulfide and bis(3,5-dimethyl-4-hydroxyphenyl)sulfide; dihydroxydiarylsulfoxides such as bis(4-hydroxyphenyl)sulfoxide; dihydroxydiphenyl compounds such as 4,4'-dihydroxydiphenyl; and dihydroxyarylfluorene compounds such as 9,9-bis(4-hydroxyphenyl)fluorene. In addition to the dihydric phenols represented by the above general formula (I), there may be also mentioned dihydroxybenzene compounds such as hydroquinone, resorcinol and methylhydroquinone and dihydroxynaphthalene compounds such as 1,5-dihydroxynaphthalene and 2,6-dihydroxynaphthalene. These dihydric phenols may be used singly or in combination of two or more thereof. From the standpoint of physical properties of the polycarbonate, the use of bisphenol A as the dihydric phenol is preferable.

The chain terminating agent used when necessary as a molecular weight controlling agent may be any compound which is ordinarily used for polycarbonate polymerization and may be selected from various compounds. As a monohydric phenol used as the chain terminating agent, there may be specifically mentioned, for example, phenol, p-cresol, p-tert-butylphenol, p-tert-octylphenol, p-cumylphenol, bromophenol, tribromophenol and nonylphenol. Above all, p-tert-butyl phenol and phenol are preferred from the standpoint of economy and easiness in availability.

In the present invention, a suitable chain branching agent may be used together with the above dihydric phenol. As the chain branching agent, there may be mentioned a polyhydric phenol having three or more hydroxyl groups, such as 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α,α'-bis(4"-hydroxyphenyl)ethyl]benzene, phloroglucine or isatinbis(o-cresol).

The method for producing a polycarbonate oligomer is not specifically limited. The following method is for example suitably used.

First, an aqueous alkali solution containing the previously described dihydric phenol as a raw material is prepared. This is then mixed with an organic solvent. With stirring, phosgene is reacted in the copresence of the aqueous alkali solution and the organic solvent to obtain a polycarbonate oligomer.

In this case, in general, the aqueous alkali solution used preferably has an alkali concentration of 1 to 15% by mass. The content of the dihydric phenol in the aqueous alkali solution is generally in the range of 0.5 to 20% by mass. Further, the organic solvent is desirably used in such an amount as to provide a volume ratio of the organic solvent phase to the aqueous phase of 5:1 to 1:7, preferably 2:1 to 1:4. The reaction time is generally 0 to 50° C., preferably 5 to 40° C.

In this reaction, after the phosgene has been reacted, it is possible to further proceed the reaction by adding an aqueous alkali solution containing a dihydric phenol, part of the molecular weight controlling agent (chain termination agent) and, if desired, a catalyst.

As the alkali used for the preparation of the aqueous alkali solution containing a dihydric phenol, there may be mentioned, for example, sodium hydroxide, potassium hydroxide, lithium hydroxide or cesium hydroxide. Above all, sodium hydroxide and potassium hydroxide are preferred and sodium hydroxide is particularly preferred. As the organic solvent, various organic solvents may be usable and there may be mentioned chlorinated hydrocarbons such as dichloromethane (methylene chloride), trichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane and chlorobenzene; toluene; and acetophenone. Above all, methylene chloride is particularly suitable. These organic solvents may be used singly or in combination of two or more thereof.

When a catalyst is used for the preparation of a polycarbonate oligomer, a phase transfer catalyst, such as a tertiary amine or its salt, a quaternary ammonium salt or a quaternary phosphonium salt, is suitably used.

As the tertiary amine, there may be mentioned triethylamine, tributylamine, N,N-dimethylcyclohexylamine, pyridine, dimethylaniline, N-methylpiperidine and N-ethylpiperidine. As the tertiary amine salt, there may be mentioned, for example, hydrochloric acid salts and bromic acid salts of the above tertiary amines. As the quaternary ammonium salts, there may be mentioned, for example, trimethylbenzylammonium chloride, triethylbenzylammonium chloride, tributylbenzylammonium chloride, trioctylmethylammonium chloride, tetrabutylammonium chloride and tetrabutylammonium bromide. As the quaternary phosphonium salts, there may be mentioned, for example, tetrabutylphosphonium chloride and tetrabutylphosphonium bromide. These catalyst may be used singly or in combination of two or more thereof. Among the above-described catalysts, a tertiary amine, particularly N-ethylpiperidine or triethylamine, is preferable.

The method of producing the polycarbonate oligomer is not specifically limited. For example, there may be used a manufacturing method which is disclosed in Patent Document 1 and in which phosgene, an organic solvent and aqueous sodium hydroxide solution of bisphenol A are continuously mixed in a pipe-type reactor, or a method which is disclosed in Patent Document 2 and in which the above raw materials are fed to a loop of a recirculation-type reactor including a resident tank and, if necessary, a mixer, a pump and a heat exchanger, to continuously produce the oligomer.

In the present invention, the emulsion solution which contains the polycarbonate oligomer and which is obtained by the reaction of an aqueous alkali solution of a dihydric phenol with phosgene is fed to a coalescer for the separation of the emulsion solution into an organic solvent phase containing a polycarbonate oligomer and an aqueous phase.

The coalescer serves to accelerate the uniting of liquid particles of disperse phase in the emulsion. When the emulsion is passed through the coalescer, the organic solvent phase is separated from the aqueous phase promptly. The separation generally occurs within a housing of the coalescer. In this case, when the separation is carried out in the state where an interface between two phases of the organic solvent phase and the aqueous phase is substantially present in the housing or in an element section within the housing, substances with intermediate specific gravities of impurities, such as metal chlorides, metal hydroxides and deteriorated monomers or polymers, accumulate in the housing. This causes shortening of the service life of the coalescer elements. Thus, not only stable separation is unable to proceed but also refining accuracy is deteriorated. As a result, there are many cases in which an organic solvent phase containing a high purity refined polycarbonate oligomer is not obtainable. The term "element section within the housing" herein is intended to refer to a region between two horizontal upper and lower surfaces of the element within the housing inclusive of such upper and lower surfaces.

For the above reasons, it is preferred that the coalescer be operated in such a manner that an interface between the organic solvent phase and the aqueous phase is not substantially present in the housing or in the element section within the housing.

The separation methods using the coalescer include the combinations shown in FIG. 1 to FIG. 4.

FIG. 1 shows an embodiment in which an oligomer separation tank (tank for still standing separation) is disposed immediately downstream of a coalescer. By additionally using the oligomer separation tank, it is possible to prevent the accumulation of impurities in a housing of the coalescer and to perform the separation in a stable manner.

Figure 2:
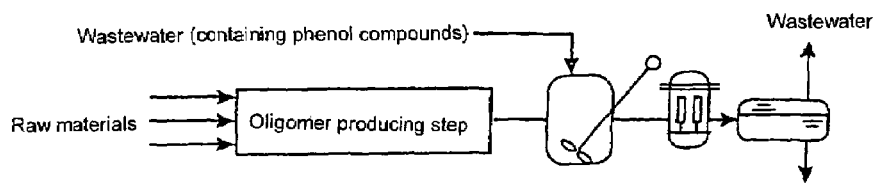
FIG. 2 is an explanatory view of an embodiment to which the method of Patent Document 1 is applied.

FIG. 2 shows an embodiment to which the method of Patent Document 1 is applied. With this method, a phenol-containing wastewater can be treated to reduce the content of organic materials in the wastewater in the polycarbonate producing apparatus.

Figure 3:
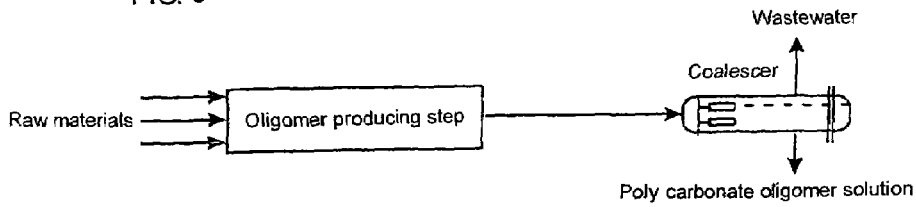
FIG. 3 is an explanatory view of an embodiment in which an apparatus functioning both as a coalescer and as a tank for still standing separation is used.

FIG. 3 shows a method in which an apparatus functioning both as a coalescer and as a tank for still standing is used. This method is adopted in Example 3 described hereinafter.

Figure 4:
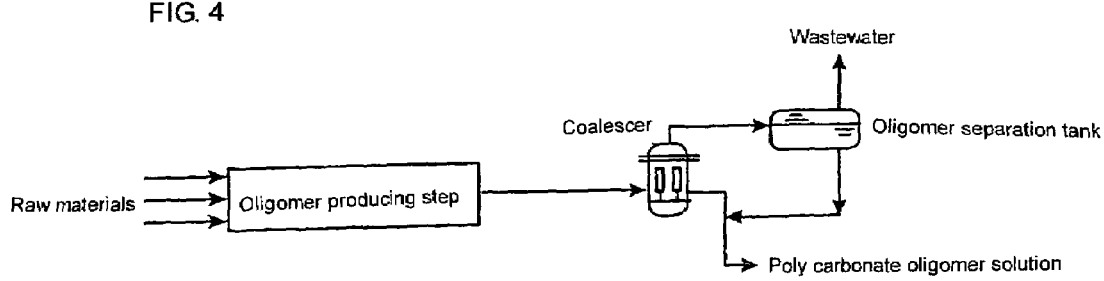
FIG. 4 is an explanatory view of an embodiment in which impurity-containing aqueous solution is discharged overhead from a coalescer such that a part of an organic solvent containing a polycarbonate oligomer is contained in the aqueous solution.

FIG. 4 shows a method in which an impurity-containing aqueous solution is discharged overhead from a coalescer such that a part of an organic solvent containing a polycarbonate oligomer is contained in the aqueous solution.

It is thus possible to efficiently perform the separation of the organic solvent phase from the aqueous phase in a stable manner for a long period of time by preventing an interface between two phases of the organic solvent phase and the aqueous phase from existing in at least the element section of the coalescer housing.

In general, the coalescer used may be of any type which is commercially available. Products of Wako Industry Co., Ltd., Japan Pall Co., Ltd., Fuji Filter Co., Ltd., Asahi Kasei Fibers Corp., etc. may be used.

In the coalescer, elements having a function to actually enhance the coalesce are mounted. The material from which the elements are made is not specifically limited. Conventionally known glass fibers, carbon fibers, metal fibers, synthetic resin fibers such as polytetrafluoroethylene (PTFE), polypropylene (PP) and polyethylene (PE), organic fibers such as paper pulp and cotton, and porous material such as porous carbon graphite may be used. Above all, carbon fibers, glass fibers and synthetic resin fibers such as PTFE are preferred for the separation of organic solvent phase containing a polycarbonate oligomer because of large fiber surface area per volume.

The shape of the coalescer element may be the best one selected in view of easiness in handling and installation and of costs. Flat-type, cylindrical-type and pleat-type elements may be used. For reasons of easiness in handling, cylindrical elements are preferred. The elements may be constructed from a fiber layer only. For the purpose of increasing the strength, a construction material such as a retainer may be also used. Alternatively, two or more multi-layered structures may be used for the purpose of improving performance or of removing foreign matters in the fluid. From the standpoint of construction, an element having a cylindrical case within which a fiber layer is fitted is preferable. The thickness of the fiber layer constituting the element may be freely determined in view of the desired performance. For example, optimization may be made in view of the thickness of the fiber layer, pressure difference ($\Delta P$) and separation performance. The element may be disposed in either of the vertical position or the horizontal position.

The amount of the polycarbonate oligomer-containing emulsion solution to be treated in the coalescer, which solution has been obtained by reaction of an aqueous alkali solution of a dihydric phenol compound with phosgene, may be determined by experiments according to the type of the coalescer used. The optimum condition is generally determined on the basis of the pressure difference in the coalescer and the properties of the liquid to be treated. The pressure difference is not specifically limited as long as the sufficient separation efficiency is ensured. However, when the initial pressure difference is high, the life time during the use is occasionally shortened or the coalescer element is occasionally damaged. The coalescer element becomes unnecessarily expensive when it has sufficient strengths. Therefore, it is advantageous that the coalescer be used in such a way that the pressure difference is generally 0.001 to 1.0 MPa, preferably 0.001 to 0.5 MPa, more preferably 0.001 to 0.3 MPa.

The polycondensation of the polycarbonate oligomer is carried out by subjecting the polycarbonate oligomer to interfacial polycondensation with a dihydric phenol compound in the presence of the remaining molecular weight controlling agent (chain terminating agent), a catalyst which is optionally used, an aqueous alkali solution, and organic solvent.

Concretely, the separated polycarbonate oligomer-containing organic solvent phase is mixed with the remaining chain termination agent, a catalyst which is optionally used, an organic solvent, an aqueous alkali solution and an aqueous alkali solution of a dihydric phenol compound, the resulting mixture being subjected to interfacial polycondensation generally at a temperature in the range of 0 to 50° C., preferably 5 to 40° C.

The alkali of the aqueous alkali solution, organic solvent and catalyst used in the above reaction may be similar to those described with regard to the method for producing the polycarbonate oligomer. The volume ratio of the organic solvent phase to the aqueous phase in the interfacial polycondensation is the same as that in the method of producing the polycarbonate oligomer.

The polycondensation of the polycarbonate oligomer may be divided into preliminary polymerization (pre-polymerization) and main polymerization (post-polymerization). Namely, the polycarbonate oligomer-containing organic solvent phase obtained from the above-described step of producing the polycarbonate oligomer is first mixed with the remaining chain termination agent, a catalyst which is optionally used, an organic solvent, an aqueous alkali solution, the resulting mixture being subjected to preliminary polycondensation (pre-polymerization) at a relatively low temperature, for example, at a temperature less than 20° C. This is then mixed with an aqueous alkali solution of a dihydric phenol compound, the mixture being subjected to main polymerization (post-polymerization) at a relatively high temperature, for example, at a temperature of 20 to 40° C.

After the reaction, the reaction mixture is diluted to a proper degree with an inert organic solvent and separated into an aqueous phase and a polycarbonate-containing organic phase by still standing, centrifuge or the like method.

The crude polycarbonate-containing organic solvent solution thus separated is subjected to a washing treatment using an aqueous alkali solution, an acidic aqueous solution, pure water, etc. for the purpose of removing impurities such as the residual monomer, catalyst and alkali substances.

The refined polycarbonate-containing organic solvent solution which has been subjected to the washing treatment is concentrated and then pulverized. The resulting flakes are subjected to a drying treatment such as by vacuum drying, thereby obtaining a high purity polycarbonate as a product. The polycarbonate may be also formed into pellets by melting and kneading the polycarbonate in an extruder, followed by extrusion into pellets.

The polycarbonate preferably has a viscosity average molecular weight (Mv) of 10,000 to 100,000. The Mv is more preferably 12,000 to 40,000, particularly suitably 13,000 to 30,000. The viscosity average molecular weight (Mv) herein is calculated from the formula: $[\eta]=1.23\times10^{-5}\,\mathrm{Mv}^{0.83}$ where $[\eta]$ is an intrinsic viscosity obtained by measuring the viscosity of a methylene chloride solution at 20° C. using a Ubbelohde viscometer.

EXAMPLES

The present invention will be next described in detail by way of examples. However, the present invention is not limited to the following examples.

In the following examples, the properties of polycarbonate oligomer, oligomer-containing organic solvent phase and polycarbonate were measured by the methods described below.

(1) Number Average Molecular Weight of Polycarbonate Oligomer:

Measured by a vapor pressure osmosis (VPO) method in accordance with ASTM D4001-93.

(2) Chloroformate Concentration of Oligomer-Containing Organic Solvent Phase:

Measured by a titration method (oxidation-reduction titration and silver nitrate titration were carried out on the basis of chlorine concentration while taking JIS K8203 into consideration.)

(3) Water Content of Oligomer-Containing Organic Solvent Phase:

Measured by the Karl Fischer method using an evaporating device in accordance with JIS K-7251.

(4) Solid Content of Aqueous Phase:

Measured by an evaporation-and-drying method. Solids were dissolved and extracted using methylene chloride. The methylene chloride was then removed by distillation and a solid content was measured.

(5) Viscosity Average Molecular Weight (Mv) of Polycarbonate:

The viscosity average molecular weight was measured by a viscosity tube method in accordance with ISO 1628-4 (1999). The solvent was methylene chloride. Calculation was done by the formula $[\eta]\,(\mathrm{dL/g})=(1.23\times10^{-4})\times\mathrm{Mv}^{0.83}$.

(6) YI Value of Test Piece Plate of Polycarbonate:

Measured in accordance with ASTM E313 (JIS K7103).

Comparative Example 1

Production of Polycarbonate Oligomer

Bisphenol A was dissolved in an aqueous sodium hydroxide solution having a concentration of 6% by weight to obtain an aqueous bisphenol A-sodium hydroxide solution having a concentration of 13.5% by weight. Using methylene chloride as an organic solvent, p-tert-butylphenol (PTBP) as a molecular weight controlling agent was dissolved therein to obtain a PTBP solution having a concentration of 25% by weight.

To a coil-type tubular reactor having an inside diameter of 6 mm and a length of 30 m and immersed in a cooling vessel adjusted at 15° C., the aqueous bisphenol A-sodium hydroxide solution, the PTBP solution and methylene chloride as an organic solvent were fed at flow rates of 40 L/hr, 0.42 L/hr and 18.5 L/hr, respectively. Further, phosgene was blown into the reactor through a T-shaped tube at a rate of 3.8 kg/hr.

From the exit of the coil-type tubular reactor, an emulsion solution of a polycarbonate oligomer-containing organic solvent was continuously obtained. This was introduced to a horizontal type tank for still standing separation with a resident time of 1 hour to continuously separate a polycarbonate oligomer-containing organic solvent phase.

When the polycarbonate oligomer-containing organic solvent phase thus separated was sampled and analyzed for the properties of the oligomer, it was found that the number average molecular weight thereof was 780 and the chloroformate concentration of the oligomer solution was 0.72 [mol/L]. The water content of the oligomer solution was measured and was found to be 4,800 ppm by weight. Further, 10 L of an aqueous phase obtained by the separation was sampled, from which solid matters were extracted with 1 L of methylene chloride. The measurement of the solid matters revealed that the solid matters were contained in an amount of 650 ppm by weight.

The above oligomer production procedure was continuously performed for 48 hours. Thereafter, the thickness of an intermediate phase material accumulated in the interface in the tank for still standing separation of the emulsion solution of a polycarbonate oligomer-containing organic solvent was measured and was found to be 12 mm.

Production of Polycarbonate

Into a tubular reactor, 20 L/hr of the oligomer-containing organic solvent phase separated as above, 11.5 L/hr of the aqueous bisphenol A-sodium hydroxide solution, 0.04 L/hr of an aqueous solution of triethylamine dissolved in pure water in an amount of 3.5% by weight as a catalyst, 0.8 L/hr of an aqueous sodium hydroxide solution having a concentration of 25% by weight and 13 L/hr of methylene chloride as a solvent were introduced from a lower part of the reactor. The resident time was 1 hour. The reaction mixture overflowing from the reactor was separated into an aqueous phase and an organic solvent phase. The organic phase was washed successively with an aqueous sodium hydroxide solution having a pH of 13.5, an aqueous hydrochloric acid solution having a pH of 1.5 and then pure water to obtain a clean methylene chloride solution of polycarbonate.

The thus obtained methylene chloride solution of polycarbonate was heated to remove the methylene chloride by evaporation. The resulting polycarbonate in the form of a rice cake-like solid was then pulverized to obtain white polycarbonate powder. The viscosity average molecular weight (Mv) of the powder was measured and was found to be 26,800.

The powder was placed in a stainless steel mold having a size of 50×50 mm and a thickness of 5 mm and heated at 320° C. for 3 minutes to obtain a transparent test piece. The test piece was subjected to a heating test in an oven at 180° C. for 48 hours in a stream of nitrogen. The YI value of the test piece plate was then measured and found to be 3.4.

Example 1

In the polycarbonate oligomer production procedures in Comparative Example 1, the emulsion solution of a polycarbonate oligomer-containing organic solvent was, before the still standing separation, first passed through a coalescer manufactured by Japan Pall Co., Ltd. (coalescer cartridge: "Phase Sep", size: 100 mm outer diameter×150 mm length) and thereafter introduced into the tank for still standing separation.

The water content of an oligomer-containing organic solvent phase obtained after separation was measured and was found to be 1900 ppm by weight. Thus, the water content was found to be reduced to a value comparable to the saturated water concentration of methylene chloride used as a solvent. The solution gave a feeling of transparency in appearance.

The solid content of an aqueous phase obtained after separation was measured in the same manner as that in Reference Example and was found to be 53 ppm by weight. The separation was confirmed to be good.

Further, the oligomer-containing organic solvent phase obtained was used for producing a polycarbonate in the same manner as that in Reference Example. The YI value of the test piece plate was then measured under the same conditions and found to be 2.8. Thus, it was confirmed that the heat resistance was improved and the quality was improved.

Example 2

Similar to Example 1, a coalescer (COALESCER manufactured by Wako Industry Co., Ltd., coalescer element: made of glass fibers, element size: 144 mm outer diameter×705 mm length) was used to obtain a polycarbonate oligomer. The properties of the oligomer and its polycarbonate were measured to give the following results:

Water content of oligomer-containing organic solvent phase: 2,000 ppm by weight

Solid matter content of aqueous phase after separation: 110 ppm by weight

YI of polycarbonate plate: 2.6

Thus, the water content of oligomer-containing organic solvent phase was sufficiently low and the aqueous phase was able to be separated well. The heat resistance of the polycarbonate was sufficiently high.

Example 3

Figure 5:
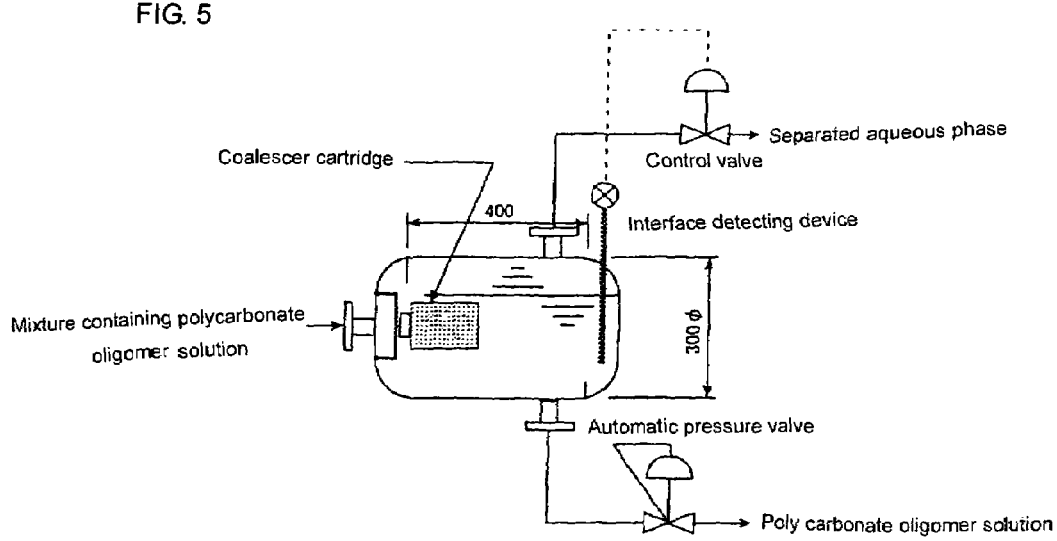
FIG. 5 is an explanatory view of the coalescer used in Example 3.

A polycarbonate oligomer was produced in the same manner as that in Comparative Example. The emulsion solution of a polycarbonate oligomer-containing organic solvent obtained was passed through a coalescer having a structure shown in FIG. 5. The coalescer used was a laterally extending vessel having an inside diameter of 300 mm and a length of 400 mm. A coalescer manufactured by Japan Pall Co., Ltd. (coalescer cartridge: "Phase Sep", size: 100 mm outer diameter×100 mm length) was mounted to one side of the vessel at which a nozzle was located. The vessel was also provided with an interface detecting device. To maintain the interface constant, a control valve was installed for controlling the discharging amount of an aqueous phase separated from a mixture discharged overhead from the reactor. The still standing separation time on the basis of the emulsion solution of a polycarbonate oligomer-containing organic solvent was about 30 minutes.

Using the oligomer-containing organic solvent phase separated, a polycarbonate was produced in the same manner as that in Comparative Example 1. The properties of the oligomer-containing organic solvent phase oligomer solution, aqueous phase after the separation and polycarbonate were measured to give the following results:

Water content of oligomer-containing organic solvent phase: 2,100 ppm by weight

Solid matter content of aqueous phase after separation: 50 ppm by weight

YI of polycarbonate plate: 2.7

Thus, the water content of the oligomer-containing organic solvent phase was sufficiently low and the aqueous phase was able to be separated well. The heat resistance of the polycarbonate was good.

INDUSTRIAL APPLICABILITY

According to the present invention, in a process for producing a polycarbonate which comprises reacting an aqueous alkali solution of a dihydric phenol compound with phosgene in the presence of an organic solvent to produce a polycarbonate oligomer and subsequently polycondensing the oligomer, an emulsion solution of a polycarbonate oligomer-containing organic solvent obtained in the polycarbonate oligomer production step is effectively separated into an organic solvent phase and an aqueous phase. In the organic solvent phase, the content of water containing impurities in the polycarbonate oligomer can be reduced so that a polycarbonate having excellent quality can be produced. In the aqueous phase after the separation, as wastewater, residual organic matter content is small and organic solvent content is reduced. Therefore, the wastewater treatment costs and energy consumption can be reduced.

The invention claimed is:

1. A process for producing a polycarbonate, comprising:
reacting an aqueous alkali solution of a dihydric phenol with phosgene in the presence of an organic solvent to obtain a polycarbonate oligomer; and
polycondensing the polycarbonate oligomer;
wherein:
reacting the dihydric phenol with phosgene yields an emulsion solution of a polycarbonate oligomer-containing organic solvent;
the emulsion solution is subjected to separation in a coalescer to separate the emulsion solution into a polycarbonate oligomer-containing organic solvent phase and an aqueous phase; and
polycondensing the polycarbonate oligomer comprises polycondensing polycarbonate oligomer in the polycarbonate oligomer-containing organic solvent phase.

2. The process of claim 1, wherein:
the polycarbonate oligomer-containing organic solvent phase obtained by separation of the emulsion solution in the coalescer is subjected to separation in a tank for still standing separation; and
polycondensing the polycarbonate oligomer comprises polycondensing polycarbonate oligomer in a polycarbonate oligomer-containing organic solvent phase obtained by separation in the tank for still standing separation.

3. The process for producing a polycarbonate as defined in claim 1, wherein the coalescer comprises mounted elements that enhance coalescence of the polycarbonate oligomer-containing organic solvent phase.

4. The process of claim 3, wherein the elements comprise at least one member selected from the group consisting of glass fibers, carbon fibers, metal fibers, synthetic resin fibers, organic fibers and porous materials.

5. The process of claim 3, wherein the elements comprise at least one member selected from the group consisting of flat-shaped elements, cylindrical-shaped elements and pleat-shaped elements.

6. The process of claim 3, wherein the coalescer operates at a pressure difference of from 0.001 to 1.0 MPa.

7. The process of claim 1, wherein the coalescer operates to accelerate uniting of liquid particles of the disperse phase of the emulsion solution.

8. The process of claim 1, wherein separation of the polycarbonate oligomer-containing organic solvent phase and the aqueous phase of the emulsion solution takes place in a housing of the coalescer.

9. The process of claim 8, wherein an interface between the polycarbonate oligomer-containing organic solvent phase and the aqueous phase of the emulsion solution is not present in the housing of the coalescer during separation.

* * * * *